US005696739A

United States Patent [19]

Chang

[11] Patent Number: 5,696,739

[45] Date of Patent: Dec. 9, 1997

[54] ALCOHOL AND TOBACCO AGE IDENTIFICATION ELECTRONIC PERPETUAL CALENDAR

[76] Inventor: Nai-Wen Chang, 20265 Valley Blvd. #D, Walnut, Calif. 91789

[21] Appl. No.: 739,306

[22] Filed: Oct. 29, 1996

[51] Int. Cl.[6] .............................. B04B 19/24; C04C 17/00

[52] U.S. Cl. .............................................. 368/29; 368/239

[58] Field of Search .................................. 368/10, 28–30, 368/37, 38, 41–43, 82–84, 223, 239–242; 40/107–120

[56] References Cited

U.S. PATENT DOCUMENTS

| | | | |
|---|---|---|---|
| 4,117,657 | 10/1978 | Shimizu | 58/4 A |
| 4,130,987 | 12/1978 | Schickedanz | 58/50 R |

*Primary Examiner*—Vit W. Miska

[57] ABSTRACT

An alcohol and tobacco age identification perpetual calendar specifically designed for cashiers of the stores that sells alcohol or tobacco products to check customer's identification and can easily verify customer's age before making the sales.

10 Claims, 2 Drawing Sheets

FIG. 2
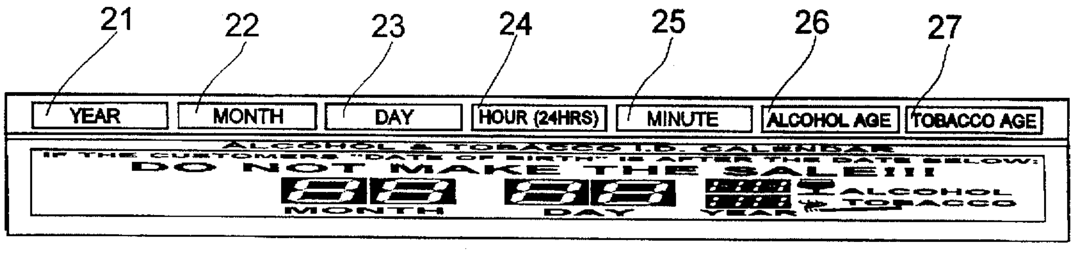
FIG.3
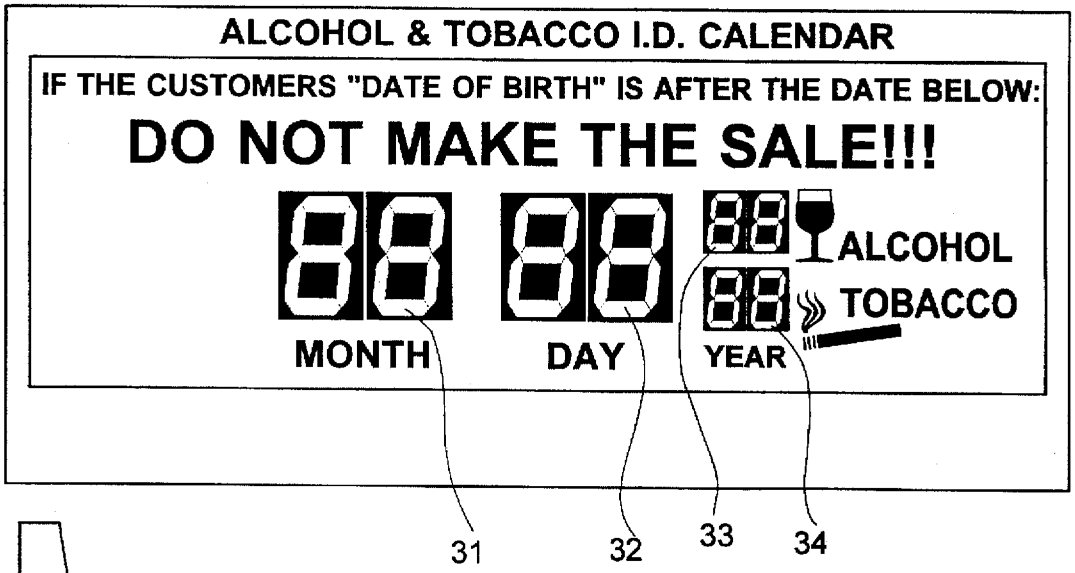
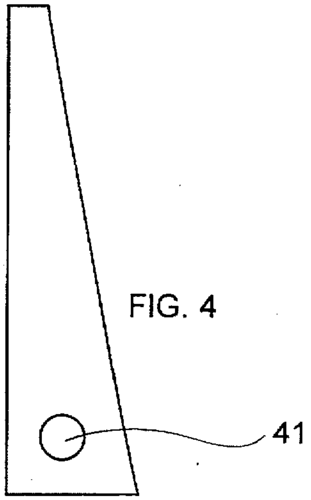
FIG. 4

ALCOHOL AND TOBACCO AGE IDENTIFICATION ELECTRONIC PERPETUAL CALENDAR

BACKGROUND OF INVENTION

The legal age for alcohol purchase in most states in U.S. is 21 years-of-age, and 18 years-of-age for tobacco purchase, while there are different age regulations for alcohol & tobacco purchase in different countries. Cashiers of the stores that sells alcohol or tobacco products often have difficulty figuring out the year of 18 or 21 years back from the current year, or do not have time to calculate the customer's age for alcohol or tobacco purchases from the "date of birth" shows on customer's identification (driver's license). It is necessary for the cashiers to have a electronic perpetual calendar that can easily tell them whether the "date of birth" shows on the customer's identification is eligible for alcohol or tobacco purchases, thus, the cashiers can check more frequently without taking additional time, and the enforcement of state laws are met, law suits will be minimized.

An Electronic Timepiece Calendar Circuit is disclosed in U.S. Pat. No. 4,117,657 to Shimizu. An electronic calendar circuit that includes a time counter, date counter, month counter, and year counter that automatically displays the date and month according to the year circuitry which also produces leap year signals. In other word, the date and month runs and displays according to the year displayed. For example, if the year of the calendar is set to 1975 which was not a leap year, the dates and months run and display according to the year of 1975, and there were only 28 days in February 1975. If cashier uses this calendar to set the year to 1975 which is 21 years back from 1996 (current year), and use it as a reference to check customer's identification for purchasing alcohol products (must be 21 years-of-age or older), the dates and months of this calendar will run according to the year of 1975 (which is not a leap year) instead of 1996 which is a leap year in which there are 29 days in February. Which means, the calendar will display Mar. 1, 1975 instead of Feb. 29, 1975 on the day of Feb. 29, 1996. Therefore Shimizu's calendar circuit could not be used to set 18 or 21 years back from current year for cashiers to use as a reference calendar when checking identification before making the sales of alcohol and tobacco products.

SUMMARY OF THE INVENTION

The present invention "Alcohol & Tobacco Age Identification Electronic Perpetual Calendar" is specifically designed for cashiers to check customer's identification more easily and frequently before making the sales of alcohol & tobacco products.

The term of "ALCOHOL YEAR" and "TOBACCO YEAR" are used here to refer to the year of a person needed to be born for legal purchase of alcohol and tobacco products. For example, in most states in U.S., the age for legally purchasing alcohol products is 21 years-of-age, and it's 18 years-of-age for tobacco purchasing. Therefore, in the year of 1996, the ALCOHOL YEAR in most states is 1975 which is 21 years back from 1996, meaning a person needed to be born by the year of 1975 or before to be able to legally purchase alcohol products, and the TOBACCO YEAR is 1978 which is 18 years back from 1996.

Once the current time, current date, current month, current year, and the legal ages for alcohol purchase (mostly 18 years-of-age in U.S.) and tobacco purchase (mostly 21 years-of-age in U.S.) are set, the present invention displays the current date, current month, and both of the ALCOHOL YEAR and TOBACCO YEAR (instead of the current year), in the mean time, the dates and months are still running according to the current year. Therefore, the present invention can be used as a perpetual electronic calendar for cashiers to easily verify if a customer's age is eligible for alcohol and tobacco purchase by simply checking the "date of birth" on the identification (driver's license) with the date, month, and ALCOHOL YEAR & TOBACCO YEAR displayed on this ALCOHOL & TOBACCO AGE IDENTIFICATION ELECTRONIC PERPETUAL CALENDAR, if the "date of birth" on the identification is after the date shows on the calendar, it means the customer's age is not eligible for either alcohol or tobacco purchase. Since the dates and months on the present invention run according to the current year set, it will not run into the same problem as Shimizu's invention mentioned above.

BRIEF DESCRIPTION OF THE DRAWINGS

FIG. 2: Top View of the Calendar.

FIG. 3: Front View of the Calendar.

FIG. 4: side View of the Calendar.

REFERENCE NUMBERS IN DRAWINGS

Figure 1:
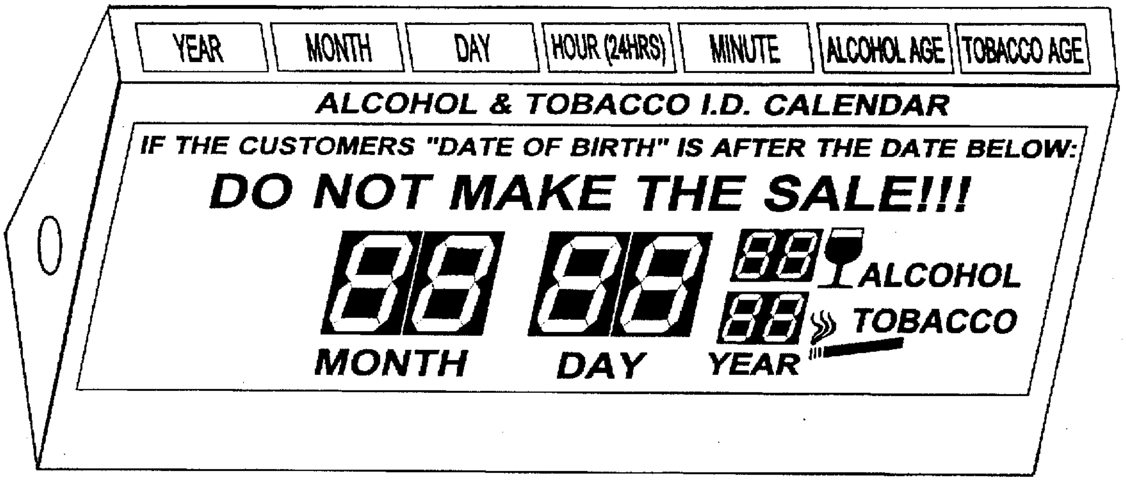
FIG. 1: A Perspective View of the Calendar.

21: Year Button: a button to set the current year.

22: Month Button: a button to set the current month.

23: Day Button: a button to set the current day.

24: Hour Button: a button to set the current hours.

25: Minute Button: a button to set the current minute.

26: Alcohol Age Button: a button to set the age for legal purchase of alcohol products.

27: Tobacco Age Button: a button to set the age for legal purchase of tobacco products.

31: Month LED: the LED displays current month.

32: Day LED: the LED displays current day.

33: ALCOHOL YEAR LED: the LED displays ALCOHOL YEAR.

34: TOBACCO YEAR LED: the LED displays TOBACCO YEAR.

41: A/C Adapter plug.

DESCRIPTION OF THE PREFERRED EMBODIMENTS

Referring to the figures, FIG. 1 shows a perspective view of the calendar with imprinting. FIG. 2 shows a top view of the calendar with the buttons (21–27) for setting the current year (21), current month (22), current day (23), current hour (24), current minute (25), the age for legal purchase of alcohol products (26), and the age for legal purchase of tobacco products (27). FIG. 4 shows the side view of the calendar with a plug hole (41) for power supply (A/C adapter). Once the power is plugged in, the month LED (31) shows "01", the day LED (32) shows "01", and both of the year LEDs (33, 34) shows "00"; set the calendar by the following steps:

1. Push the year button (21) once, only both of the year LEDs (33, 34) will display "00" and can be adjusted by pushing the year button (21), stop when the number shows on the year LEDs (33,34) reaches current year;
2. Push the month button (22) once, only the month LED (31) will display "01" and can be adjusted by pushing the month button (22), stop when the number shows on the month LED (31) reaches current month;
3. Push the day button (23) once, only the day LED (32) will display "01" and can be adjusted by pushing the day button (23), stop when the number shows on the day LED (32) reaches current day;

4. Push the hour button (24) once, only the month LED (31) will display "00" to adjust current hour, push the hour button (24) until the number on the month LED (31) shows the current hour (military hours);
5. Push the minute button (25) once, only the day LED (32) will display "00" to adjust current minute, push the minute button (25) until the number on the day LED (32) shows the current minute;
6. Push the alcohol age button (26) once, only the ALCOHOL YEAR LED (33) will display "00", push the alcohol age button (26) until the number shows on the ALCOHOL YEAR LED (33) reaches the legal age for alcohol purchase;
7. Push the tobacco age button (27) once, only the TOBACCO YEAR LED (34) will display "00", push the tobacco age button (27) until the number shows on the TOBACCO YEAR LED (33) reaches the legal age for tobacco purchase;

Once these steps are set, the clock is running, the month and date on the calendar will run perpetually according to the current year set, and wait for 5 seconds, the calendar will do the calculation and automatically display the current month on the month LED (31), the current day on the day LED (32), the ALCOHOL YEAR (current year minus legal age for purchasing alcohol) on the ALCOHOL YEAR LED (33), and the TOBACCO YEAR (current year minus legal age for purchasing tobacco) on the TOBACCO YEAR LED (34).

When the cashier sees a customer appears to be under the age of purchasing alcohol or tobacco products, the cashier will ask for customer's identification; the cashier would just simply check the "date of birth" on the identification without any thinking or calculating process, and easily verify if the customer's "date of birth" is after the date shows on the calendar. If the customer's "date of birth" is after the date shows on the calendar, it means the customer's age is not eligible for purchasing alcohol or tobacco products on that date, therefore, the cashier should not make the sale. Cashiers do not have to think or calculate the age and year anymore, so they will check identifications more frequently, and thus reduces the sales of alcohol and tobacco products to minors.

The calendar described above is very easy to set and to use. The control circuit board may include two programmable counters for setting the ages for legal purchasing of alcohol and tobacco products. The display may be either a light emitting diode (LED) or a liquid crystal device (LCD). The calendar is A/C powered with a rechargeable battery back-up. The calendar can be set on top of any cash register or attached on the wall with velcro. The size and color of the LED is large and bright enough for cashiers and customers to easily and clearly see the date.

The present invention has been described with what is to be the most practical and preferred embodiment, it is to be understand that the invention is not to be limited to the disclosed embodiment, but is intended to cover various modifications and equivalent arrangement included with the spirit and scope of the appended claim, which scope is to be accorded the broadest modifications and equivalent structure.

I claim:

1. An alcohol and tobacco age identification electronic perpetual calendar comprising:

a housing for accommodating a control circuit board, power supply, setting buttons and a digital display;

means for providing calendar functions;

said display displaying said calendar functions and having a first portion for displaying a date, a first year display for identifying a legal alcohol sale, and a second year display for identifying a legal tobacco sale;

said setting buttons being arranged to control setting of said calendar functions and said display.

2. An alcohol and tobacco age identification electronic perpetual calendar as recited in claim 1, wherein the setting buttons; digital display and the power supply are connected to said control circuit board.

3. An alcohol and tobacco age identification electronic perpetual calendar as recited in claim 1, wherein the control circuit board provides standard perpetual calendar functions that can be set by the setting buttons to the current year, current month, current date, current hour, and current minute.

4. An alcohol and tobacco age identification electronic perpetual calendar as recited in claim 1, wherein the control circuit board comprises two programmable counters for setting the ages for legal purchasing of alcohol and tobacco products according to the individual state or country requirements.

5. An alcohol and tobacco age identification electronic perpetual calendar as recited in claim 4, wherein the digital display displays the current month, current date, and two separate years; the first year is the ALCOHOL YEAR which is the current year minus the legal age for alcohol purchasing that was set into one of the programmable counters; the second year is the TOBACCO YEAR which is the current year minus the legal age for tobacco purchasing that was set into the other programmable counter as.

6. An alcohol and tobacco age identification electronic perpetual calendar as recited in claim 5, wherein both ALCOHOL YEAR and TOBACCO YEAR display at the same time, and the perpetual calendar runs according to the current year set instead of either the ALCOHOL YEAR or the TOBACCO YEAR.

7. An alcohol and tobacco age identification electronic perpetual calendar as recited in claim 1, wherein the power supply device can be A/C power or a battery powered system.

8. An alcohol and tobacco age identification electronic perpetual calendar as recited in claim 1, wherein the power supply includes re-chargeable battery that works as back-up system that provides electricity for the perpetual calendar during power failure.

9. An alcohol and tobacco age identification electronic perpetual calendar as recited in claim 1, wherein the digital display comprises an LCD.

10. An alcohol and tobacco age identification electronic perpetual calendar as recited in claim 1, wherein the digital display comprises an LED.

* * * * *